(12) United States Patent
Billen

(10) Patent No.: US 7,317,573 B2
(45) Date of Patent: Jan. 8, 2008

(54) CARTON WITH REMOVABLE THREE-DIMENSIONAL VIEWER

(75) Inventor: William D. Billen, Topeka, KS (US)

(73) Assignee: Kid Stuff Marketing, Inc., Topeka, KS (US)

( * ) Notice: Subject to any disclaimer, the term of this patent is extended or adjusted under 35 U.S.C. 154(b) by 44 days.

(21) Appl. No.: 11/037,616

(22) Filed: Jan. 18, 2005

(65) Prior Publication Data

US 2006/0158733 A1    Jul. 20, 2006

(51) Int. Cl.
G02B 27/22  (2006.01)
B65D 27/04  (2006.01)
B65D 1/34   (2006.01)
B65D 5/10   (2006.01)

(52) U.S. Cl. .......................... 359/474; 229/103; 229/71; 206/557

(58) Field of Classification Search .............. 359/474, 359/477, 466, 464, 462; 40/365; 206/738, 206/216, 549, 557, 565; 229/103, 71
See application file for complete search history.

(56) References Cited

U.S. PATENT DOCUMENTS

| 2,714,448 | A | * | 8/1955 | Brown ........................ 206/216 |
| 2,821,884 | A | * | 2/1958 | Austin ........................ 206/756 |
| 4,558,528 | A | * | 12/1985 | Cunningham ................. 40/365 |
| 4,947,985 | A | * | 8/1990 | Crabtree et al. ............. 206/738 |
| 5,309,281 | A | * | 5/1994 | Rover ......................... 359/474 |
| 5,454,508 | A |   | 10/1995 | Billen |
| 5,864,973 | A |   | 2/1999 | Cole |
| 6,432,371 | B1 |   | 8/2002 | Oliver, Jr. |
| 6,471,059 | B2 |   | 10/2002 | Purvis |
| 6,594,927 | B2 |   | 7/2003 | Witkowski |

* cited by examiner

Primary Examiner—Audrey Chang
(74) Attorney, Agent, or Firm—Chase Law Firm, L.C.

(57) ABSTRACT

A tray with an upstanding billboard or panel that displays a three-dimensional image is provided by a carton assembly comprising sheet material having fold lines defining parts that are movable to assembled positions presenting a tray for receiving food, beverage or other items of interest to the user, and a display panel having an image printed thereon by a three-dimensional process. The display panel is part of a panel structure that provides a carrier for a viewer that may be removed from the panel structure by the user in order to see and enjoy the three-dimensional image.

5 Claims, 5 Drawing Sheets

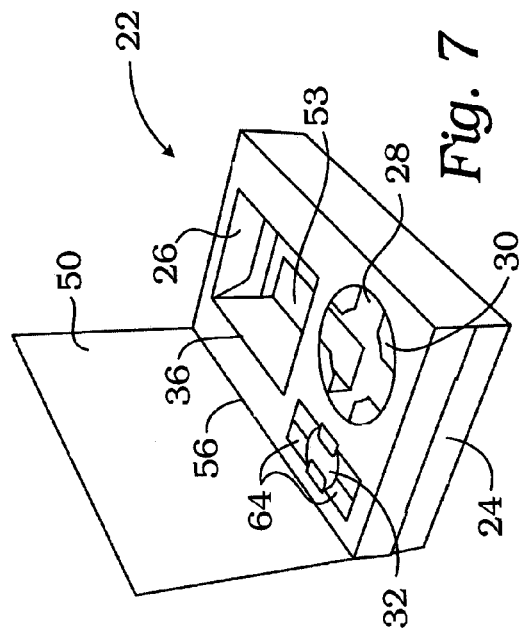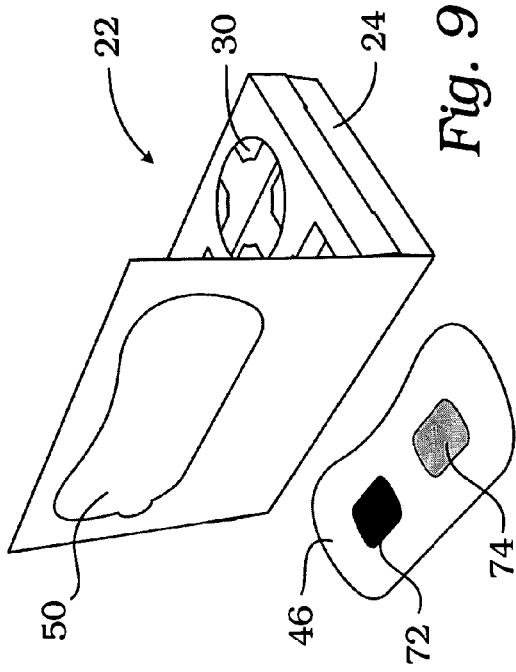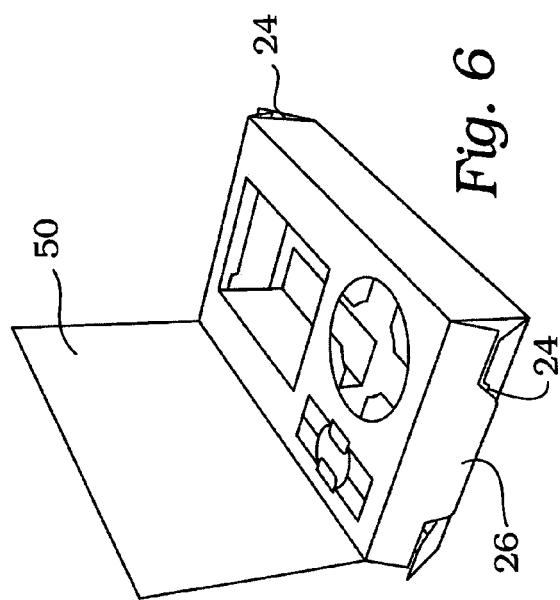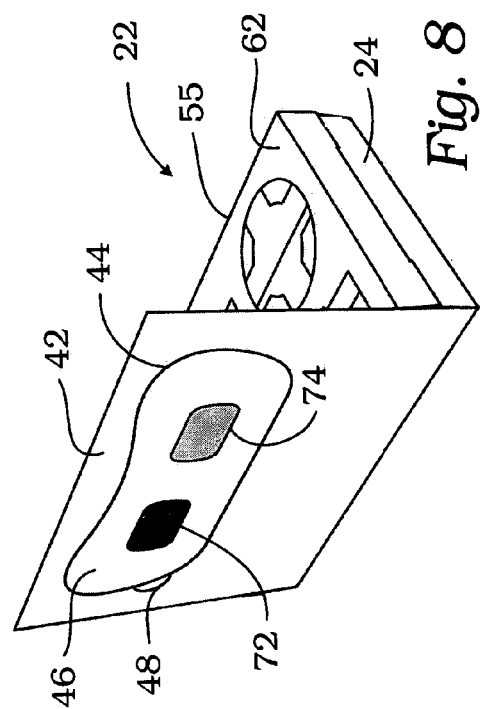

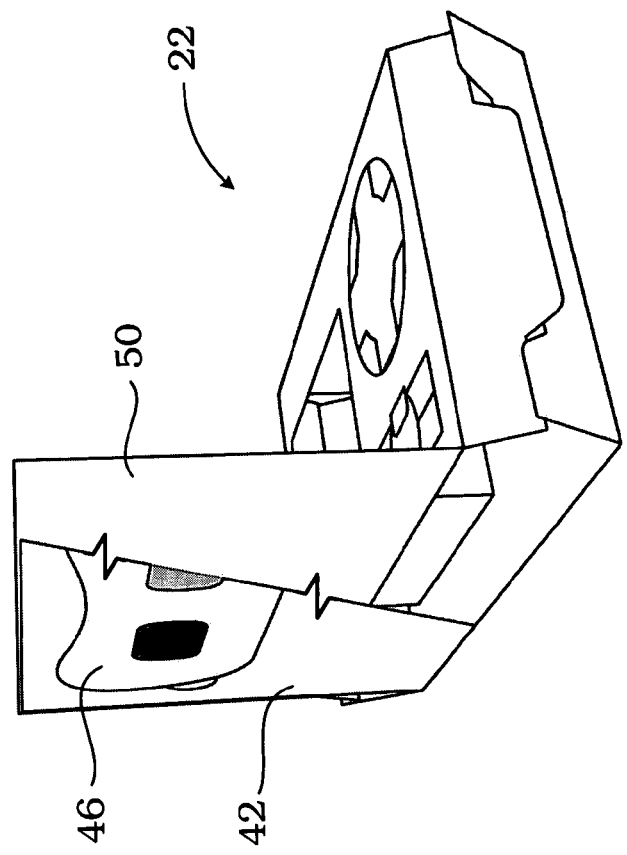
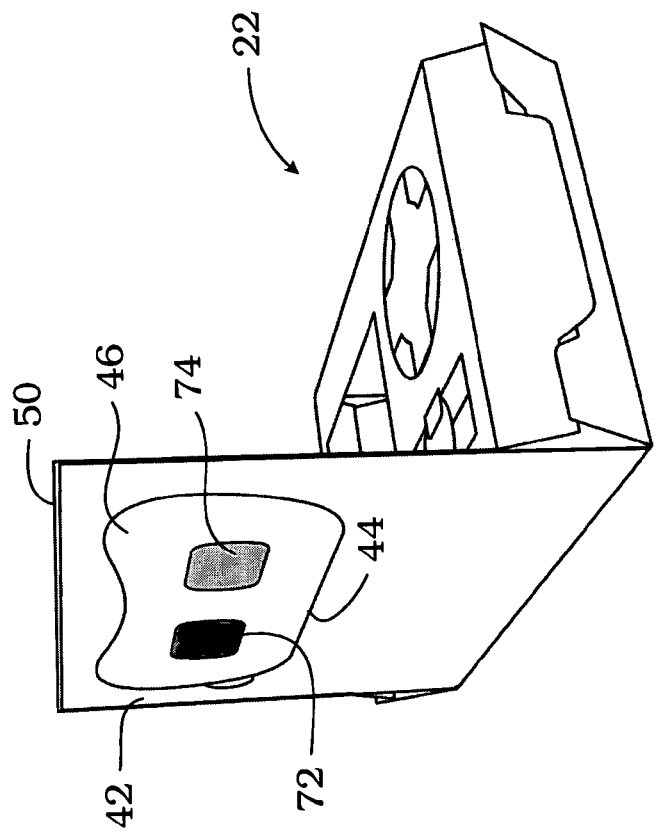

CARTON WITH REMOVABLE THREE-DIMENSIONAL VIEWER

This invention relates to cartons or trays which are formed from a sheet of cardboard or similar material, and which are used to hold food, beverage or other items of interest to the user and also provide a billboard or display panel for the enjoyment and amusement of the user.

BACKGROUND OF THE INVENTION

Disposable cardboard trays for holding food items have been used by restaurants and theaters as a convenience for their customers and in particular, to organize and hold food for children and create additional interest by designs that are displayed on the tray or carton. Typically, the trays are formed from a cardboard like material and assembled from a die cut sheet by folding various panels and tabs along score lines in the material into an assembled shape. Particularly with respect to young children, printed material on the tray adds to the child's interest and may comprise designs showing cartoon characters or other portrayals that hold the user's attention. Furthermore, as the tray organizes food items together on a disposable tray, it minimizes the volume of separate pieces of trash that must ultimately be disposed of by the provider.

These cartons and trays also provide a medium for advertising in theaters, fast-food restaurants and the like, as well as organizing the items purchased and maintaining the child's interest. Three-dimensional images are particularly appealing but require a special viewer in addition to the tray in order to reveal images in three dimensions.

BRIEF DESCRIPTION OF THE INVENTION

In an embodiment of the present invention a tray with an upstanding billboard or panel that displays a three-dimensional image is provided by a carton assembly comprising sheet material that has a base portion and fold lines defining parts that are movable to assembled positions presenting a tray for receiving food, beverage or other items of interest to the user. One of the parts presents a top portion which is normally horizontally disposed during use of the tray and is spaced above the base portion, and which has front and rear edges and at least one opening therein between the edges for receiving and holding at least one desired item. The display panel is provided by a panel structure movable about a line of fold at the rear edge of the top portion to an upright position wherein the panel structure presents a front surface having an image printed thereon by a three-dimensional process. The rear surface of the panel structure has a line of weakness therein circumscribing a viewer that may be removed from the panel structure by the user. The viewer has eye openings therein for the left and right eyes of the user containing lenses that reveal the image in three dimensions so that a scene revealed by the image may be viewed while using the tray.

Other advantages of this carton assembly and associated three-dimensional image will become apparent from the following description taken in connection with the accompanying drawings, wherein is set forth by way of illustration and example an embodiment of the present invention.

BRIEF DESCRIPTION OF THE DRAWINGS

FIGS. 4, 5, 6 and 7 are sequential views showing the additional stages of assembly of the tray.

FIG. 8 is a rear perspective view showing the three-dimensional viewer prior to removal from the rear layer of the display panel.

FIG. 9 is a view similar to FIG. 8 but showing the viewer after removal from the rear panel layer.

FIG. 10 is a perspective view showing the rear of the display panel and one end of the tray at the stage of assembly shown in FIG. 6, showing the double laminated construction of the display panel structure.

FIG. 11 is a view similar to FIG. 10 but with a portion of the rear panel layer broken away.

DETAILED DESCRIPTION

Referring initially to FIGS. 1-7, a sequence of steps is illustrated and shows a flat piece of sheet material 20 (FIG. 1) which, after the assembly operation is complete, becomes an assembled carton or tray 22 (FIG. 7). The sheet material is paperboard or a similar semi-rigid material capable of retaining fold lines and die cut so that openings are formed upon removal of the cutout portions. A suitable material is 18-point white C1S SBS stock or a thin plastic material capable of retaining fold lines and being folded to a desired configuration. As is evident from FIG. 1, in its initially unassembled state, the sheet material 20 is planar and flat.

Figure 1:
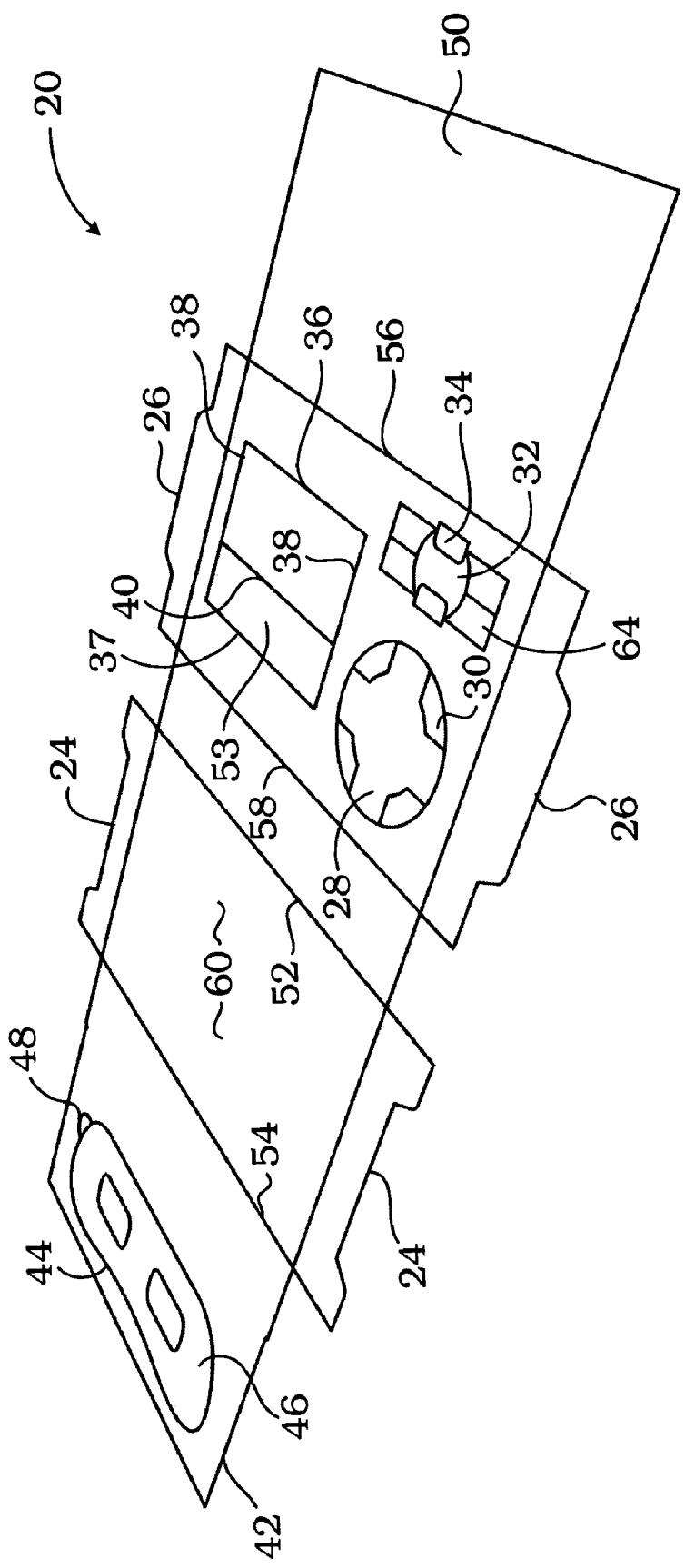
FIG. 1 is a perspective view of a piece of flat sheet material having openings therein and fold lines thereon, from which a carton or tray is formed.

FIG. 1 shows that the sheet material 20 has a number fold lines therein, the purpose of which will be described below. Additionally, the sheet stock from which material 20 is formed is die cut to provide the perimeter configuration shown, which is essentially an elongated rectangle with a pair of opposed, transversely projecting flaps 24, and a pair of opposed, transversely projecting flaps 26. Additionally, a circular opening 28 has four circumferentially spaced tabs 30 projecting thereinto, and an adjacent opening 32 has two opposed tabs 34 projecting into opening 32 for a purpose to be subsequently discussed. Adjacent thereto, a rectangle is defined by a fold line 36, a slit 37 and two slits 38, and has a fold line thereacross at 40.

At the left end of sheet material 20 as viewed in FIG. 1, a rectangular rear panel layer 42 of the assembled carton (see FIG. 8) is die cut to provide a continuous line of weakness 44 with spaced nicks (not shown) in the die cut line to prevent release of a viewer 46 until the carton is in use, as will be discussed below. The panel layer is cut through at 48 and the material removed providing an opening for the user's fingertip to facilitate removal of the viewer 46, which has an eye mask configuration. A front panel layer 50 at the right end of the sheet material 20 will present a billboard or display panel when the carton is assembled.

Figure 3:
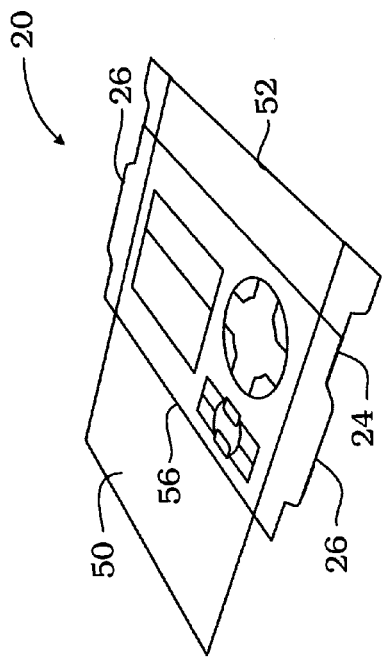
FIG. 3 shows the sheet material after the initial fold is completed and glue is applied to form a double laminated display panel.
Figure 2:
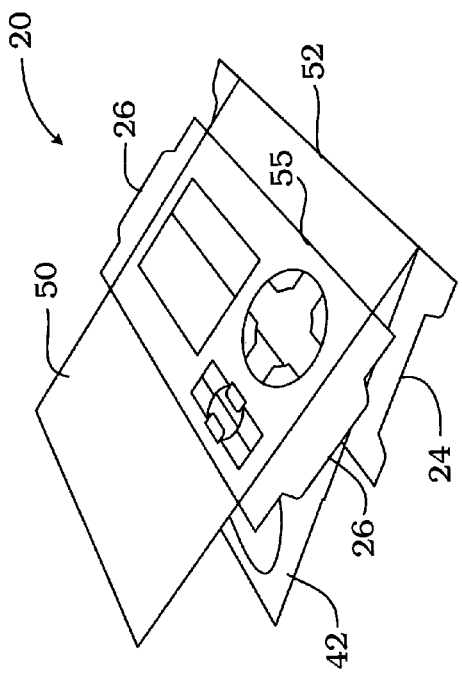
FIG. 2 shows the sheet material as an initial fold is made.
Figure 4:
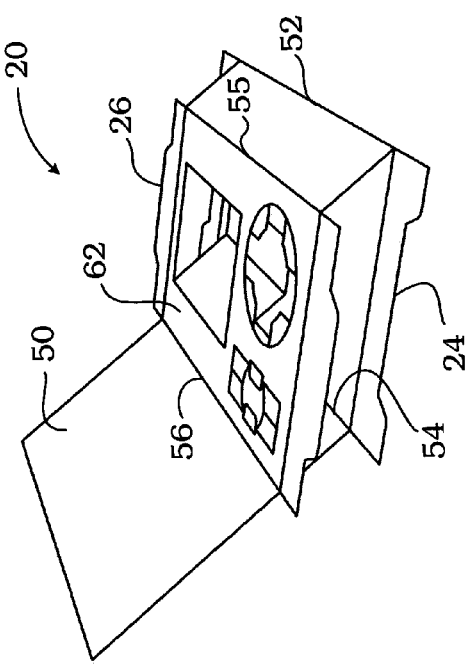

Now referring to FIGS. 1 and 2, an initial fold is made at a fold line 52 extending transversely across sheet material 20 at essentially the longitudinal center thereof. FIG. 3 shows the two halves in overlying relationship with front panel layer 50 overlying rear panel layer 42 (not visible). At this point in the assembly, glue is applied (not shown) to the upper surface of rear panel layer 42 in areas thereof spaced from the viewer 46 in order to adhere the two layers 42 and 50 together and form a laminated panel structure. Glue is also applied to a rectangular area 53 between transverse slit 37 and fold line 40 so that area 53 will adhere to base portion 60 at the stage of assembly shown in FIG. 3. In this stage of partial assembly (FIG. 3) with the laminated panel structure formed, the carton material is still flat and easy to handle and thus would be provided to the user in this form.

Figure 5:
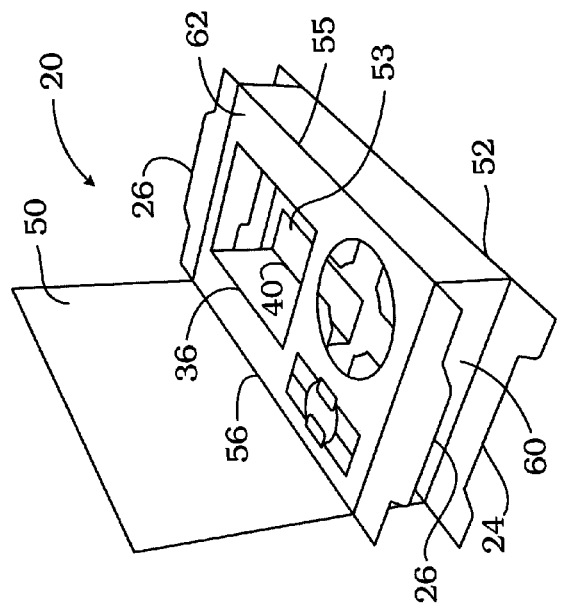

The user may readily complete the assembly as shown in FIGS. 4-7. Comparing FIGS. 1 and 4, it may be seen that the laminated panel 50, 42 is folded about line 54 until it reaches an upright position (FIG. 5). As the panel layers 42 and 50 are now glued together to provide a composite panel structure, a fold line 56 across the bottom of front panel layer 50 defines the rear edge of top portion 62 of the tray. The front edge of the tray is defined by fold line 55 parallel to initial fold 52. The rectangular area 53, being adhered to the underlying base portion 60, presents a foot that supports a post provided by the material between fold lines 36 and 40, thereby supporting the top portion 62 of the assembled carton in spaced relationship above base portion 60 as is typically done in rectangular trays of this general type that are assembled from flat stock.

FIGS. 6 and 7 show the completion of the assembly of the tray 22 by insertion of each upper flap 26 into the corresponding lower flap 24 at each end of the tray in a conventional manner. The tray is now ready for use as food and beverage items, for example, may be inserted into the pockets or holders provided by openings 28 and 32 and the rectangular opening presented by the material that depends from fold line 36 and is utilized as the supporting post and foot 53. The four tabs 40 projecting into circular opening 28 bend downwardly upon insertion of a cup, for example, to hold it in place. Likewise, the tabs 34 and four associated tabs 64 secure an item, such as a premium, inserted into opening 32.

Figure 12:
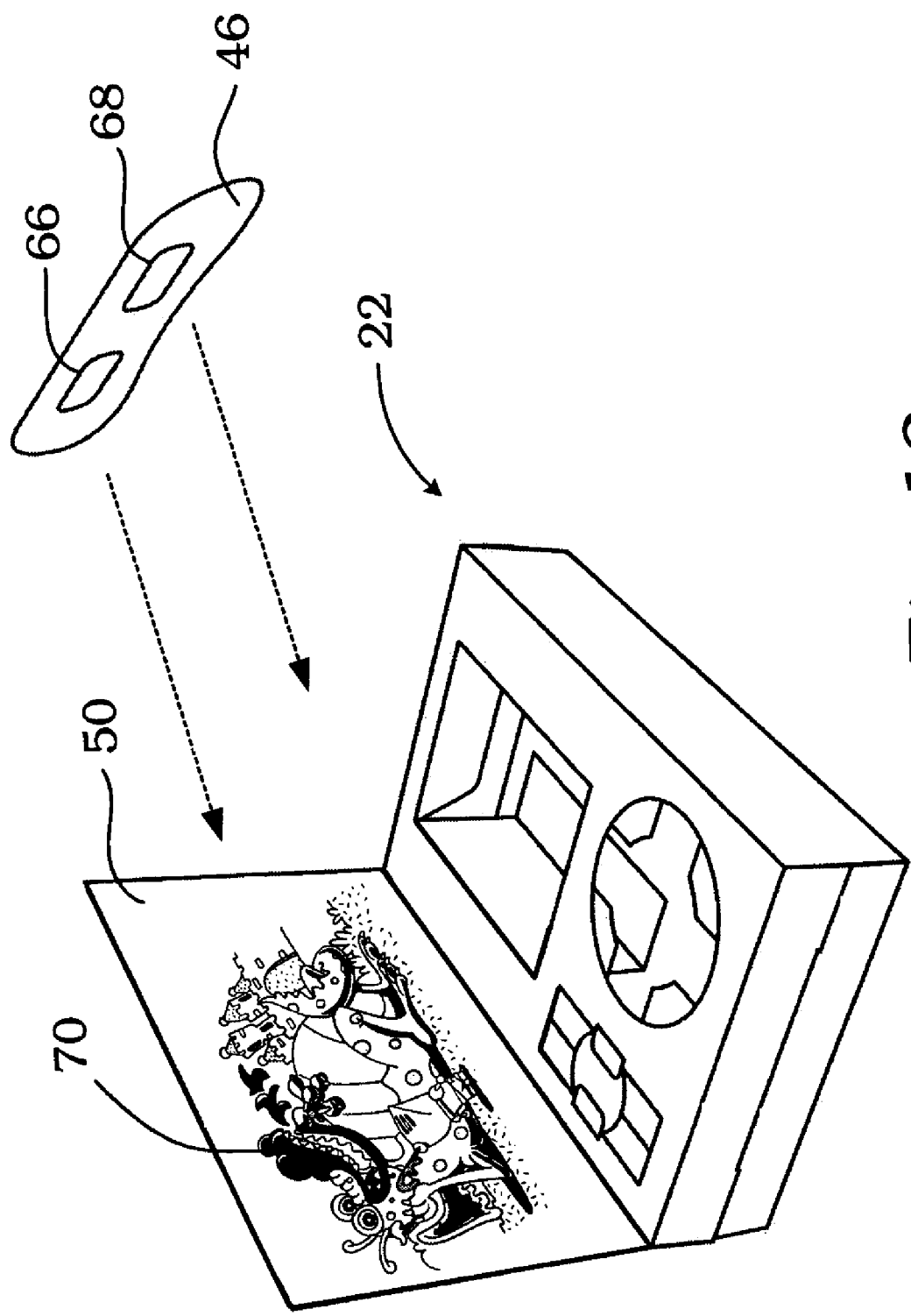
FIG. 12 is a perspective view of the tray from the front showing the three-dimensional image on the front panel layer and illustrating the use of the viewer to reveal the image in three dimensions.

The double laminated panel structure 42, 50 is shown in greater detail in FIGS. 8-11 where the tray 22 is shown in perspective from the rear and one end. In FIG. 8 the viewer 46 is in place and forms a part of the rear panel layer 42. In FIG. 9 the viewer 46 has been removed by the user, revealing the rear surface of a portion of the front panel layer 50 where the viewer 46 had previously been held. FIGS. 10 and 11 are similar views and somewhat enlarged and show the carton or tray at the stage of assembly corresponding to FIG. 6, and reveal that the rear panel layer 42 is slightly shorter and narrower than the front panel layer 50. The viewer 46 has a right eye opening 66 and a left eye opening 68 and, once removed, as depicted in FIG. 12, is held by the user in order to view an image 70 printed on the front surface of the panel layer 50 by a three-dimensional process. Therefore, the user can enjoy the items (not shown) held in tray 22 while viewing an interesting scene such as the fanciful cartoon characters illustrated by image 70.

Three-dimensional printing processes are known and any of these may be utilized to print the image 70 on the front surface of panel layer 50. If an anaglyph process is utilized, then the viewer 46 would be provided with red and blue lenses to create the three-dimensional effect. For example, FIGS. 8 and 9 illustrate that eye openings 66 and 68 are windowed with a red polyfilm right lens 72 and a blue polyfilm left lens 74. Each lens may be held in place in the associated eye opening 66, 68 by any suitable means. For example, a piece of polyfilm lens material may be cut larger than the associated eye opening 66 or 68 to present a margin that is glued to the viewer material around the opening.

From the foregoing, it may be appreciated that the double laminated panel construction provides two important functions. The front panel layer 50 serves as a billboard or display surface for presenting a three-dimensional image of interest to the user of the tray. Second, the rear panel layer 42 provides both the viewer 46 and a carrier for the viewer until it is detached from the panel by the user.

It is to be understood to be understood that while certain forms of this invention have been illustrated and described, it is not limited thereto, except insofar as such limitations are included in the following claims.

Having thus described the invention, what is claimed as new and desired to be secured by Letters Patent is as follows:

1. A carton assembly presenting an image for viewing by a user, said assembly comprising:
   a sheet material presenting a base portion and having fold lines defining parts that are movable about said fold lines to positions presenting a tray for receiving items including food or beverage,
   one of said parts presenting a top portion spaced above said base portion, and which has front and rear edges and at least one opening therein between said edges for receiving and holding at least one of said items,
   said sheet material further including panel structure movable about a line of fold at said rear edge of the top portion to an upright position,
   said panel structure in said upright position presenting a front surface having a stereoscopic image printed thereon, and a rear surface having a line of weakness therein circumscribing a viewer to permit removal of said viewer from said panel structure by the user,
   said viewer having eye openings therein for the left and right eyes of the user containing lenses that reveal said image as a three dimensional illusion upon said removal of the viewer and use thereof by the user to view the image, whereby a scene revealed by the image may be viewed while using the tray.

2. The carton assembly as claimed in claim 1, wherein said panel structure is of laminated construction and includes a front panel presenting said front surface, and a rear panel presenting said rear surface.

3. A carton assembly presenting an image for viewing by a user, said assembly comprising:
   a sheet material presenting a base portion and having fold lines defining parts that are movable about said fold lines to positions presenting a tray for receiving items including food or beverage,
   one of said parts presenting a top portion spaced above said base portion, and which has front and rear edges and at least one opening therein between said edges for receiving and holding at least one of said items,
   said sheet material further including a laminated panel structure movable about a line of fold at said rear edge of the top portion to an upright position,
   said panel structure in said upright position including a front panel layer having a stereoscopic image printed thereon, and a rear panel layer having a line of weakness therein circumscribing a viewer to permit removal of said viewer from said rear panel layer by the user,
   said viewer having eye openings therein for the left and right eyes of the user containing lenses that reveal said image as a three dimensional illusion upon said removal of the viewer and use thereof by the user to view the image, whereby a scene revealed by the image may be viewed while using the tray.

4. The carton assembly as claimed in claim 3, wherein said viewer includes an eye mask.

5. A carton assembly presenting an image for viewing by a user, said assembly comprising:

a sheet material having fold lines defining parts that are movable about said fold lines to positions presenting a tray for receiving items including food or beverage, said sheet material including panel structure extending upwardly from a rear of the tray and having a front surface with a stereoscopic image printed thereon, and a rear surface having a line of weakness therein circumscribing a viewer to permit removal of said viewer from said panel structure by the user, said viewer having eye openings therein for the left and right eyes of the user containing lenses that reveal said image as a three dimensional illusion upon said removal of the viewer and use thereof by the user to view the image, whereby a scene revealed by the image may be viewed while using the tray.

\* \* \* \* \*